July 9, 1929.  C. D. TURLINGTON  1,720,580
SHADE ROLLER RETAINING MEANS
Filed Aug. 21, 1928
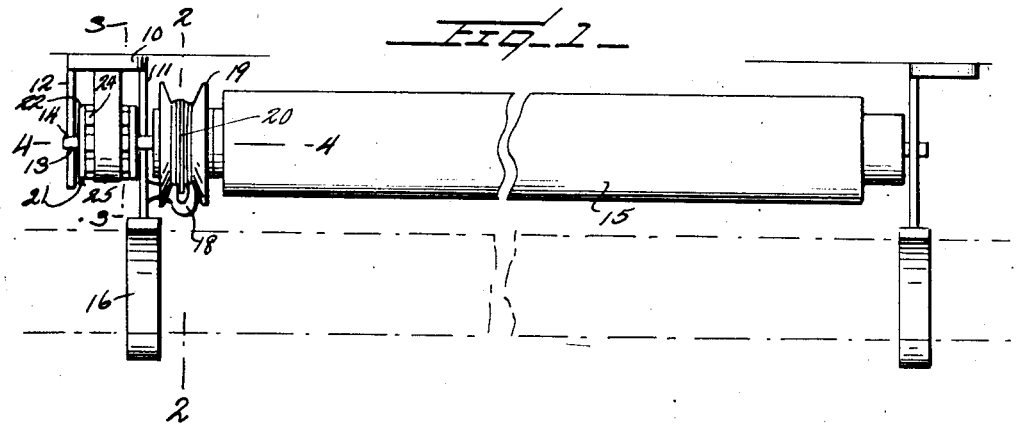
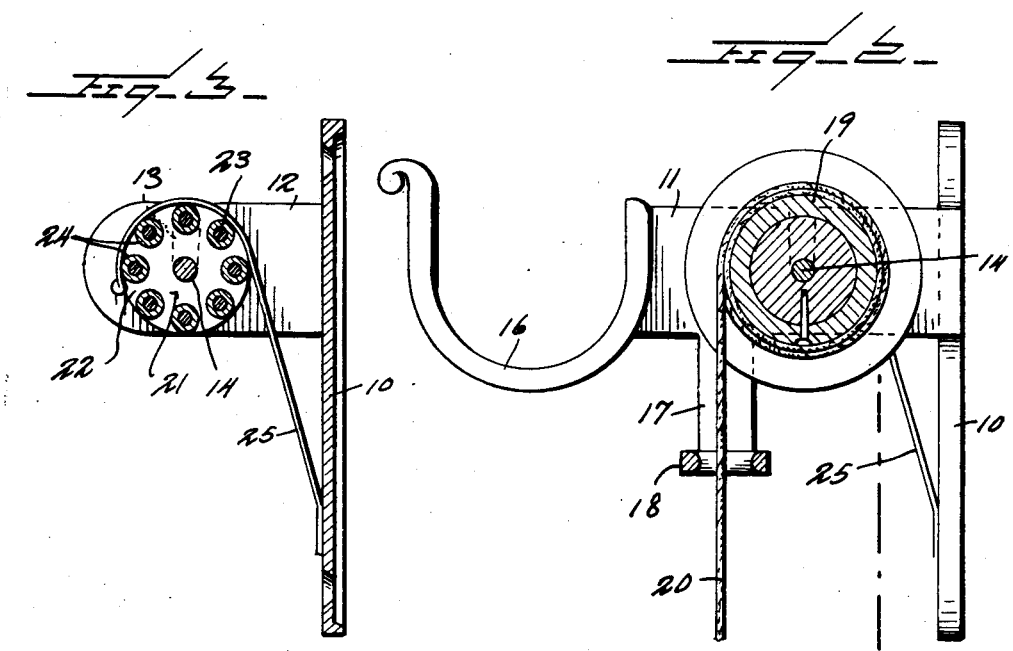
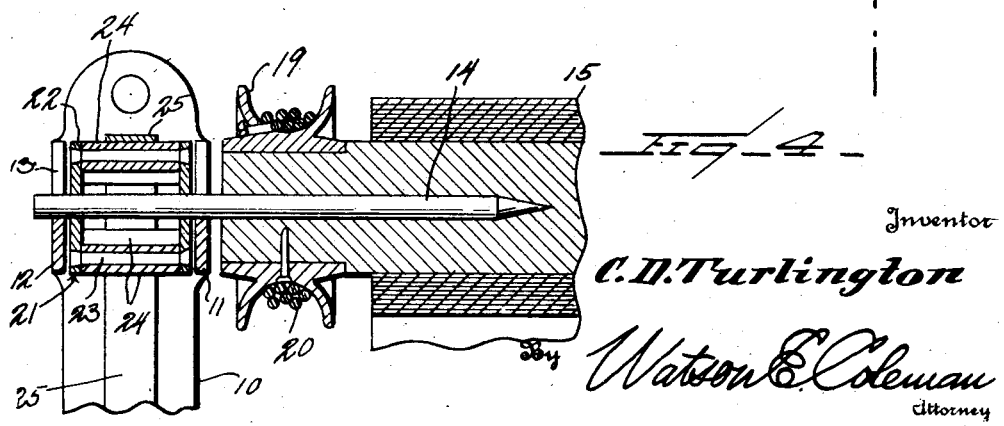

Patented July 9, 1929.

1,720,580

UNITED STATES PATENT OFFICE.

CHARLES D. TURLINGTON, OF LILLINGTON, NORTH CAROLINA, ASSIGNOR OF ONE-HALF TO ERNEST F. YOUNG, OF DUNN, NORTH CAROLINA.

SHADE-ROLLER-RETAINING MEANS.

Application filed August 21, 1928. Serial No. 301,044.

This invention relates to shade supports of that character wherein the shade roller is supported upon brackets for rotation and is provided with a pulley, there being a cord attached to the pulley so that when the shade is pulled down, the cord will be wound up and when the cord is pulled downward the shade will be pulled up.

The general object of the invention is to provide an improved friction brake or retainer, as it may be called, acting to hold the shade roller and the shade in any adjusted position, and a further object is to provide the roller with a friction wheel constituted of a plurality of three rotatable rollers mounted in bearings and provide a brake band of thin resilient metal attached to the shade supporting bracket extending over the friction drum and bearing against the rollers thereof to thereby hold the shade in any adjusted position.

My invention is illustrated in the accompanying drawings wherein—

Figure 1 is a top plan view of a shade roller support and brake, constructed in accordance with my invention;

Figure 2 is a section on the line 2—2 of Fig. 1;

Figure 3 is a section on the line 3—3 of Fig. 1; and

Figure 4 is a longitudinal section through the shade roller and the brake mechanism.

Referring to the drawings it will be seen that the bracket comprises the base portion 10 having outwardly projecting spaced arms 11 and 12. These arms are provided with vertically extending slots 13 for the reception of the gudgeon 14 of a shade roller 15. Inasmuch as the opposite bracket has much the same form of the bracket now described, there is no necessity of describing this bracket.

The extremity of the bracket is provided with the depressed curtain pole supporting portion 16. Depending from the arm 11 of the bracket is a shank 17 having an angularly bent apertured guide 18 for the passage of the cord. The shade roller 15 carries upon it the pulley 19 over which the cord 20 passes, one end of the cord being engaged with the pulley by aperturing the side of the pulley and threading the cord through this aperture. The end of the shade roller 15 is preferably reduced and extended through the hub of this pulley. Attached to the gudgeon 14 which projects out beyond the pulley 19, is a friction drum 21 consisting of two end members 22 connected by transverse pins 23 upon which are mounted the rollers or sleeves 24. These are loose upon the pins so that they may freely rotate.

The drum 21 is disposed between the two arms 11 and 12 and attached to the base 10 and extending upward and partially around the drum is a spring brake or detainer 25, the extremity of this spring brake being curved so as to resiliently embrace and contract on the rollers of the drum 21.

This spring is riveted or otherwise attached to the base 10 of the bracket and when it is engaged with the drum 21 it frictionally retards the movement of the shade roller in winding up or unwinding the shade and thus holds the shade roller in its adjusted position.

I have found that unless the spring bracket engages a drum having therein the rollers 24, too much friction is created and, therefore, it is necessary that the friction wheel, as the drum 21 may be termed, shall be formed of a plurality of anti-friction elements such as the freely rotatable sleeves 24. It will, of course, be understood that the spring 25 must be initially adjusted to secure the proper frictional bearing on the sleeves 24.

The use of this device will be obvious, the curtain is pulled down and this acts to wind up the cord 20, or the cord is pulled and winds up the curtain. In either event the shade roller will be held in its adjusted position by the spring having frictional engagement with the drum 21 and yet the friction between the drum 21 and the spring or brake band 25 is not sufficient to prevent the free movement of the curtain. Shades of this character are usually supposed to remain in adjusted position but very often, after the shade has been pulled partly down or partly up, the weight of the shade will cause it to run downward to a drawn position, and my object is to provide simple means which will prevent this accidental movement of the curtain and hold it yieldingly in the position in which it is adjusted.

What I claim is—

1. The combination with a shade roller having a winding wheel thereon and a shade thereon, the winding wheel carrying a cord wound up on the said wheel by pulling down the shade and adapted to wind up the shade, and brackets supporting the shade roller, of a friction drum mounted upon the shade roller and rotating therewith, and a resilient bracket band attached to the bracket and extending over a portion of the friction drum and bearing frictionally thereagainst to retain the shade roller in its adjusted position, the friction drum being composed of opposed members, pins extending across the same and rotatable sleeves mounted upon the pins and against which the bracket band bears.

2. The combination with a shade roller, a pulley thereon, a cord attached to the pulley and a shade on the shade roller, the roller having gudgeons, of a friction drum mounted upon one of said gudgeons and including a plurality of transversely extending rotatable sleeves, a bracket for supporting this end of the shade roller, the bracket having a base and a pair of spaced outstanding arms slitted to receive said gudgeon, the friction drum being disposed between said arms, and a leaf spring mounted upon the bracket and extending upward and partially around the friction drum and bearing yieldingly against said sleeves.

In testimony whereof I hereunto affix my signature.

CHARLES D. TURLINGTON.